Feb. 28, 1967 D. M. PARK 3,307,076
PHOTOCELL ACTUATED CURRENT CONTROL CIRCUIT
Filed June 10, 1964
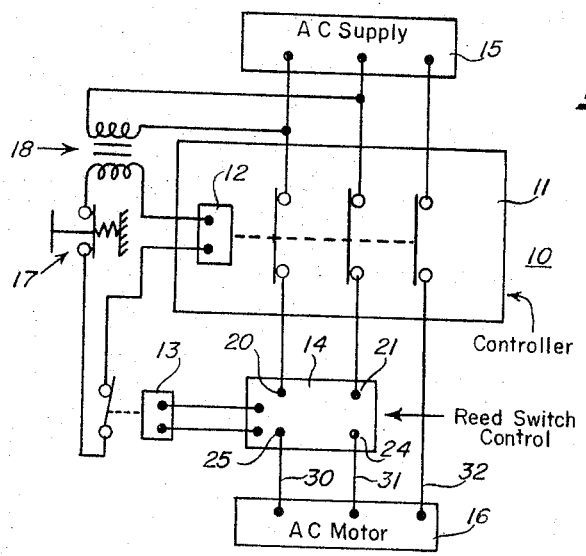
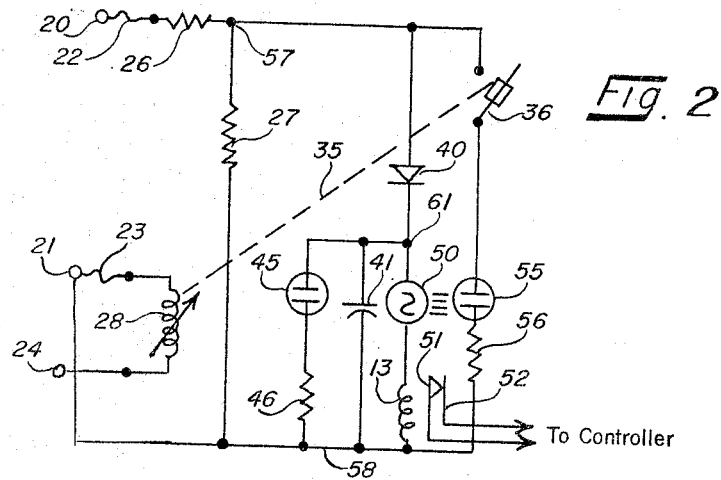
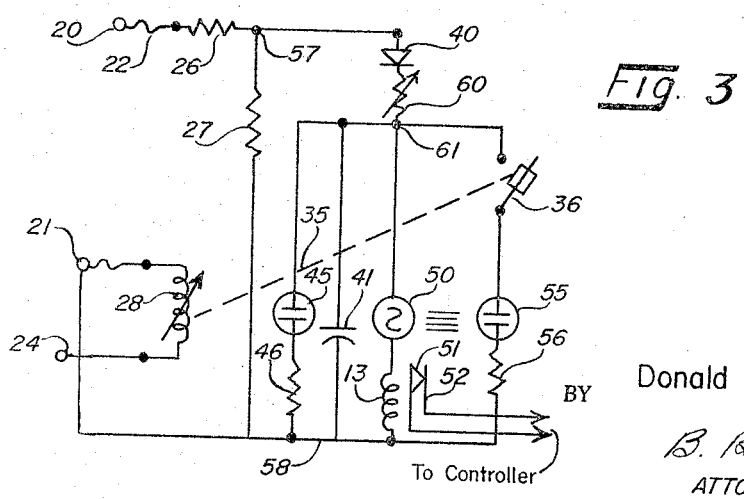
INVENTOR.
Donald M. Park
BY
B. B. Olive
ATTORNEY United States Patent Office 3,307,076
Patented Feb. 28, 1967

3,307,076
PHOTOCELL ACTUATED CURRENT CONTROL
CIRCUIT
Donald M. Park, Raleigh, N.C., assignor to Dur-Ral Electronics Co., Inc., Raleigh, N.C., a corporation of North Carolina
Filed June 10, 1964, Ser. No. 374,194
4 Claims. (Cl. 317—49)

This invention relates to control circuits for relay means and more specifically to a fast acting relay control circuit in which the relay is operated by stored capacitor current passed through a photocell type conductor that is made conductive by a light source controlled by the magnitude of current being controlled. The circuitry of the invention is especially useful as an overload device.

This application is a continuation in part of an application filed July 19, 1963, Serial No. 296,242 entitled "Overcurrent and Undercurrent Control Circuit."

As previously pointed out in the deferred to copending application, conventional overload control devices use various forms of clocks, fixed timing circuits, thermal relays or the like to compensate for the initial current surge. The time delay in conventional overload devices is thus dictated not by the load requirement but rather by the characteristics of the particular time delay means employed. Consequently, a given rating of overload device is limited in its range of operation and its reliability is tied to a great extent to the reliability of the time delay system employed with the device. Many conventional overload devices are relatively slow in operation compared to the speed with which electrical equipment must be cut off from the electrical source in order to avoid damage in a high current situation. Much damage has resulted to electrical and related mechanical equipment because of the inability of the conventional overload equipment device to respond fast enough. Another characteristic of conventional overload protective circuits is that they are usually not adapted to both alternating and direct current uses. Conventional overload devices are frequently operable only at one specific current setting or at the most perhaps four specific current values.

An object of the present invention is to provide a system for almost instantaneously sensing when a current in an electric line exceeds some predetermined boundary value and employing the sensed current change to interrupt current flow in an electric line.

Another object of the present invention is to provide a system for almost instantaneously sensing a rise in current in an electric line of some predetermined value above a previously reached steady state value and simultaneously employing the effect of the rise to interrupt current flow in an electric line.

Another object of the invention is to provide an overload protective circuit which does not depend on clocks, fixed timing circuits, thermal relays and the like for providing the necessary delay during the initial starting surge.

Another object of the invention is to provide an overload protective circuit which will trip out in the event the initial starting surge exceeds over a time period exceeding some predetermined time.

Another object of the invention is to provide an overload protective circuit in which the tripping response time is substantially lower than with thermal relay type protective circuits and the like.

Another object is to provide an overload protective circuit which adapts itself to both alternating current and direct current applications.

Another object is to provide an overload protective circuit which can be adjusted to many different current values.

These and other objects of the invention will become apparent from the description and the drawings in which a circuit embodying the invention is shown.

FIGURE 1 is a block diagram of a typical application of the invention.

FIGURE 2 is a detailed circuit diagram of a circuit embodying the invention.

FIGURE 3 is a detailed circuit diagram of an alternative embodiment of the invention.

In accordance with a preferred form of the invention as applied to protecting electric motors, the line current is passed through a low impedance coil whose field influences a normally open reed switch such that the coil field tends to close the reed switch contact. When closed, the reed switch passes a control current which energizes a light source and completes a heavy direct current path through a photocell, made conductive by the light source, to the relay or other device being controlled. The operating current which passes through the photocell to the relay is provided primarily by a capacitor which charges during the steady state normal operation of the motor and discharges through the relay only when the reed switch is closed under the influence of an overcurrent. The range of operation may be regulated to many current settings by an adjustable core in the coil. The circuit is arranged such that during startup when there is normally a heavy surge of current to the motor, insufficient current reaches the relay to cause it to operate and the capacitor is prevented from charging due to the charge being drained off by reason of the cycling on and off of the reed switch. Furthermore, in one embodiment the relay will automatically trip out in the event the startup surge does not settle down to a steady state value within some predetermined time. Protection is afforded by the circuit whether under alternating current or direct current operation so long as the values of the components are selected for the particular operation to be followed.

Referring now to the diagram of FIGURE 1 showing one form and application of the invention, there is shown an alternating current power system 10 which includes a controller 11 having a normally closed power relay 12 the opening of which is controlled by the normally closed control relay 13, preferably of the lockout type, which in turn is controlled by the reed switch relay control circuit 14 embodying one form of the invention and to be explained later. Power is supplied from a source 15 through the controller 11 through the reed switch control 14 and to the power consuming device represented by the alternating current motor 16. Assuming a steady state situation has been achieved, controller 11 and relay 13 remain closed thereby allowing power to flow to and operate motor 16 however, upon occasion of an overcurrent, reed switch control 14 causes relay 13 to open thereby causing relay 12 to open and the power to motor 16 to be shut off. Manual operation is provided by a pushbutton switch 17 and suitable low voltage control current is provided by transformer 18. While a three phase alternating current operation is set forth in the drawing, it should of course be understood that the same basic arrangement may be adapted for direct current operation.

Referring now to FIGURE 2 which is a detailed diagram of the reed switch control 14, there is shown a pair of input terminals 20, 21, protected by suitable fuses 22, 23, and a pair of output terminals 24, 25 (also shown in FIGURE 1). Between terminal 20 and terminal 21 there are connected two resistors 26, 27 in series to form a voltage divider. Between terminal 21 and terminal 24 there is connected a relatively low impedance, variable inductance, coil 28. Coil 28 may, for example, have a movable core or other means may be employed for varying its inductance. Terminals 21 and 24 carry the line current for one of the three lines 30, 31, 32 serving motor 16 and by reason of being in series with terminals 21 and 24, coil 28 operates as a line current sensing device and as a source of field strength proportional to the line current. As indicated by the dashed line 35, the field produced by coil 28 is arranged so that it tends to close the normally open contacts of a magnetic reed switch 36. That is, reed switch 36 tends to open and close under the influence of the alternating current magnetic field produced by coil 28 which field as previously stated is proportional to the line current going to the power consuming device which in this case is illustrated as being the motor 16. In order that control 14 may be adjusted to different current ranges, the field effect of coil 28 is regulated by regulating its inductance through suitable means such as by the mentioned movable core, not shown, the setting of which determines the operating current range.

A relatively low alternating current voltage is obtained from the previously mentioned voltage divider consisting of the series combination of resistor 26 and resistor 27 connected across terminals 20 and 21. A relatively low alternating current voltage is thereby furnished to a rectifier 40 that is connected to the voltage divider and which in turn makes available a relatively low direct current control voltage for operation of the remainder of the control circuitry to be explained.

To complete the circuit description with reference to the embodiment of FIGURE 2, a filter capacitor 41 for the direct current supply is connected in series with rectifier 40 and this series combination is connected across resistor 27. In parallel with capacitor 41 is the series combination which includes the neon gas tube indicating light 45 and the current limiting resistor 46. Also in parallel with capacitor 41 is a photocell 50 and the operation coil of the relay 13 which controls the making and breaking of a connection between the relay terminals 51 and 52. The previously mentioned reed switch 36 is connected in series with a light source in the form of neon gas tube 55 and in further series with a current limiting resistor 56. This series combination is in turn connected on one side to a point 57 between resistors 26 and 27 and on the other side to terminal 21 through line 58.

For reasons that will become apparent, tube 45 should be arranged in the actual apparatus so that any light it produces will be visible to the operator of the equipment in which the invention is employed. However, the photocell 50 and the tube 55 should be arranged so that the light emitted by tube 55 falls exclusively on photocell 50 and so that photocell 50 receives light from no source except tube 55.

Considering the operation of the invention, it should be appreciated that the purpose of the circuit of the invention is to effect a control function whenever a particular line current being sensed exceeds some predetermined value, depending on the setting of coil 28. Assuming the alternating current voltage supply 15 is energized by a 60-cycle source through switching means not shown, closing of relay 12 will cause the power to flow through reed switch control 14 to the motor 16. An initial surge of current will result and reed switch 36 will vibrate at 120 cycles per second. Prior to energization of the system, capacitor 41 will have been in a discharged condition, indicator light 45 will have been off, tube 55 will have been off and consequently photocell 50 will have been non-conductive, relay contacts 51, 52 would be closed and coil 28 would have been adjusted to some particular setting determined by the overload setting desired.

With the current startup surge in the system, the reed switch 36 as previously stated will be vibrating and its closing time will be sufficient to keep capacitor 41 drained of any substantial charge and will thus maintain photocell 50 non-conductive and in an inoperative state. In fact the various component values particularly those of capacitor 41 and resistor 56 are chosen such that the necessary timing delay to overcome the startup surge, irrespective of its time spread, is an inherent characteristic of the invention's circuitry. While some minor current value may trickle through photocell tube 50 and relay coil 13, the values of the components are again such as to prevent sufficient current to flow at this time to actually open contacts 51 and 52. That is, during startup, the circuit of the invention automatically accommodates itself to the value and duration of the initial current surge and assumes a steady state sensing condition after the startup surge.

As the startup surge current falls toward a steady state value the field produced by coil 28 will gradually fall until at some point in time there is insufficient field to vibrate reed switch 36 and at this time reed switch 36 will assume its normally open position. Capacitor 41 will now charge and after reaching its full charge, the circuit is in a sensing condition. Indicator light 45 will now glow so as to indicate a sensing condition, the values of tube 45 and resistor 46 being chosen with this result in view. Assuming that an overloading of motor 16 occurs sufficient to draw line current exceeding the value for which the coil 28 was set, the field of coil 28 will rise sufficiently to momentarily close reed switch 36 so as to cause tube 55 to light and make photocell tube 50 conductive and operational by reason of tube 55 light striking photocell tube 50. A relatively heavy current path is immediately created through the photocell tube 50 to the relay coil 13 which acts to open contacts 51 and 52 and through the circuitry previously explained to cause relay 12 to open thereby shutting off power to motor 16. Depending on the component values chosen, such action can be made to take place in a matter of micro-seconds and substantially faster than thermal relay action and the like.

While it is not desired to be limited to the specific circuit illustrated or to specific component values, the following values, corresponding generally to the operating characteristics of FIGURE 4, were employed in a circuit made according to FIGURE 2:

| | |
|---|---|
| Line supply | 220 volts, 60 cycles. |
| Coil 28 | 42 turns No. 14 wire 1″ long by $\frac{9}{16}$″ diameter, $\frac{9}{16}$″ by 1″ screw adjusted for core. |
| Resistor 26 | 22K ohms, ½ watt. |
| Resistor 27 | 50K ohms, 1 watt. |
| Resistor 46 | 470K ohms, ½ watt. |
| Resistor 56 | 10K ohms, ½ watt. |
| Resistor 40 | 50 milliamperes, diode type. |
| Capacitor 41 | 20 µfd., 250 volt. |
| Reed Switch 36 | G.E. Y-1027. |
| Photocell 50 | G.E. X-6. |
| Neon Tubes 45, 55 | Ne 23. |
| Relay 13 | Potter-Brumfield KRP5D. |

With the circuit components described, it was found that the power could be tripped in an average of about 1,000 micro-seconds.

For direct current operation of the circuit of FIGURE 2, rectifier 40 may be eliminated which insures correct polarity of terminal 20. Thus, with a direct current supply and a direct current motor in place of the alternating current supply and motor, the same type of protection is afforded. For a mixed plant operation of direct current and alternating current motors, the invention's ability to adapt to either application offers a means for substantially reducing inventory of spare controls, spare parts and the like.

It will be noted in considering FIGURE 2 that a basic characteristic is the employment of a secondary direct voltage supply fed by the primary supply and a capacitor so arranged that it charges fully from the secondary supply and so indicates by a visible light (tube 45) only after the circuit has undergone the initial startup surge. Another basic characteristic is that the capacitor discharges through an electron valve, the photocell, and operates the control device, the relay, only when the photocell has been triggered by a triggering means that depends on a line current sensing device, this being coil 28 in FIGURE 2. The circuit of FIGURE 3 is basically the same as that of FIGURE 2 except that it incorporates the feature of automatically tripping out in the event a steady state is not achieved within a predetermined time on startup. For example, the invention has been applied to textile carding machines where the operator may find on startup that the card drum or some other rotatable element of the machine is physically locked by reason of extraneous materials such as a cotton wad being jammed in gear teeth. In this event the circuit needs to be tripped out immediately.

The elements in FIGURE 3 which correspond to the elements of FIGURE 2 bear the same numerals and operate basically in the same manner though the values may be changed from those previously listed. However, it will be noticed in regard to FIGURE 3 that a variable resistor 60 is connected in series with the output side of rectifier 40 and that the input side of reed switch 36 has been tied to a point 61 which is also common to one side of the photocell tube 50 and capacitor 41. In operating this embodiment of the invention, the basic functioning on overload after a steady state has been achieved is the same as in the circuit of FIGURE 2 except that the reed switch 36 carries direct current rather than alternating current. The functioning prior to achieving steady state, in the circuits of FIGURES 2 and 3 is different however in that the FIGURE 3 circuit can be made to sense and trip out when an overload appears for a predetermined time before an initial steady state condition is achieved.

Considering the circuit of FIGURE 3, it will be seen that the R-C time constant established by resistor 60 and capacitor 41 can be controlled by resistor 60. In the event of an overload condition at startup, capacitor 41 can be made to charge, by a proper setting of resistor 60, at a faster rate than it is being discharged by reason that no discharge path is present since tube 55 is off. Tube 55 will not operate tube 50 until the voltage of capacitor 41 has risen high enough to fire tube 55. No current can flow through tube 55 and resistor 56 until tube 55 fires. Thus at some point in time, again depending on the setting of resistor 60, the capacitor 41 will achieve sufficient charge so that when it momentarily discharges through tube 55, sufficient light will be created to activate photocell tube 50 sufficiently to pass enough current to operate relay coil 13 and thereby open contacts 51, 52. Thus once it is known by experiment how much time is normally required for the startup surge to settle down to a steady state condition, resistor 60 can be regulated accordingly. Once resistor 60 is so regulated, the circuitry of FIGURE 3 offers both pre-steady state and post-steady state overload protection.

Having described the invention, what is claimed is:

1. In combination, an alternating voltage load circuit, means for supplying alternating voltage to the load circuit; a load circuit interrupter; a relay having a coil operative when energized to actuate the interrupter; a direct voltage supply energized from said alternating voltage supply and being in series with said relay coil; a substantially low impedance coil disposed to produce a magnetic field proportional to a line current in the load circuit; a normally open magnetic field operated switch disposed to be closed by some predetermined value of the low impedance coil field; an electric light source connected to be dependent for energization upon closing of said switch; a photocell tube connected to be supplied by and being in series with said supply and relay coil and being dependent on said light source for conductivity; a capacitor connected in parallel with said photocell tube and in series with said direct voltage supply, whereby to be charged by said supply when said photocell tube is non-conducting and to be discharged through said photocell tube when it is conducting, the field of said low impedance coil being effective to close said switch upon the obtaining of said value whereby to energize said light source, make said photocell tube conductive, energize said relay coil and actuate said interrupter.

2. The combination of claim 1 in which said switch and light source form a first path, said photocell tube and relay coil form a second path, said capacitor forms a third path and in which said first, second and third paths are in parallel and the parallel combination is supplied by and is in series with said supply; a resistor in series with said combination and supply, said resistor being effective in conjunction with said capacitor to provide a current through said light source sufficient to make said photocell conductive and said relay coil operative in the event the inrush current to said load circuit lasts beyond some predetermined time as established by the value of said resistor and capacitor.

3. The combination with a load circuit; means for supplying power to the load circuit; an interrupter circuit adapted to interrupt the power at a predetermined line current value, said interrupter circuit including a direct voltage source; a control relay coil; a substantially low impedance coil disposed to produce a magnetic field proportional to said line current value; a normally open magnetic field operated switch disposed to be closed by the field produced by said low impedance coil at said predetermined line current value; a capacitor connected to be charged by the direct voltage source when said switch is open; a photocell tube connected in series with said relay coil and the series combination thereof being connected in parallel with said capacitor and furnishing a discharge path therefor when said photocell tube is conductive; an electric light source connected in series with said switch and arranged to be energized when said switch is closed upon the obtaining of said value whereby to actuate said photocell tube, discharge said capacitor through said relay coil and thereby actuate said interrupter.

4. In combination, an electrical load circuit; a primary voltage supply for said load circuit; a load circuit interrupter; a relay having a coil operative when energized to actuate said interrupter; a secondary direct voltage supply energized from said first supply; a capacitor connected to be charged by said secondary direct voltage supply; a photocell tube connected in series with said relay coil and the combination thereof being connected in parallel with said capacitor; a relatively low impedance coil disposed to produce a magnetic field proportional to a line current in the load circuit; a normally open magnetic field operated switch disposed to be closed by some predetermined value of the low impedance coil field; an electric light source connected in series with said switch and the combination thereof being connected in parallel with said capacitor; a variable resistor connected between said secondary supply and said capacitor enabling the charging rate of said capacitor to be regulated; said light source being effective to actuate said photocell upon said field achieving said value and to discharge said condenser through said relay coil to actuate said interrupter and said resistor being effective to make energization of said light source independent of said field having first reached a steady state value.

References Cited by the Examiner

UNITED STATES PATENTS 3,181,030    5/1965    Weinstein _____ 317—124 X

MILTON O. HIRSHFIELD, *Primary Examiner.*

J. D. TRAMMELL, *Assistant Examiner.*